(12) United States Patent
Abe et al.

(10) Patent No.: US 12,052,056 B2
(45) Date of Patent: *Jul. 30, 2024

(54) OPTICAL COMMUNICATION NETWORK SYSTEM, OPTICAL NETWORK UNIT, AND OPTICAL COMMUNICATION METHOD

(71) Applicant: NIPPON TELEGRAPH AND TELEPHONE CORPORATION, Tokyo (JP)

(72) Inventors: Takuya Abe, Musashino (JP); Satoshi Narikawa, Musashino (JP); Tomohiko Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 17/915,753

(22) PCT Filed: Mar. 31, 2020

(86) PCT No.: PCT/JP2020/014759
§ 371 (c)(1),
(2) Date: Sep. 29, 2022

(87) PCT Pub. No.: WO2021/199250
PCT Pub. Date: Oct. 7, 2021

(65) Prior Publication Data
US 2023/0122395 A1    Apr. 20, 2023

(51) Int. Cl.
*H04B 10/27* (2013.01)
(52) U.S. Cl.
CPC ................... *H04B 10/27* (2013.01)
(58) Field of Classification Search
CPC .................................................. H04B 10/27
(Continued)

(56) References Cited

U.S. PATENT DOCUMENTS

| 9,319,236 B2 * | 4/2016 | Griswold ............ H04L 12/2872 |
| 2008/0232804 A1 * | 9/2008 | Absillis ..................... H04J 3/14 |
| | | 398/71 |

(Continued)

FOREIGN PATENT DOCUMENTS

JP       200774256 A    3/2007

OTHER PUBLICATIONS

Basic Technology Course [GE-PON Technology] 4th GE-PON Systematization Function, NTT Technical Journal, vol. 17, No. 11, 2005, pp. 59-61.

(Continued)

*Primary Examiner* — Dalzid E Singh
(74) *Attorney, Agent, or Firm* — Harness, Dickey & Pierce, P.L.C.

(57) ABSTRACT

An object of the present disclosure is to enable an ONU to acquire ID information of terminal devices even when a network device is connected between the ONU and the terminal devices, and to thereby enable generation of a logical path between the ONU and the OLT. The present disclosure relates to an optical communication network system configured to connect a terminal device and a passive optical network (PON) system via a network device. The PON system includes an optical line terminal and an optical network unit connected using an optical transmission line. The network device is configured to acquire ID information of the terminal device, and notify the optical network unit of the acquired ID information. The optical network unit is configured to acquire ID information of the terminal device from the network device, and generate a logical path to the optical line terminal on the optical transmission line using the acquired ID information.

4 Claims, 8 Drawing Sheets

(58) Field of Classification Search
USPC .......................................................... 398/58
See application file for complete search history.

(56) References Cited

U.S. PATENT DOCUMENTS

| | | | | |
|---|---|---|---|---|
| 2009/0269063 | A1* | 10/2009 | Bernard | H04Q 11/0067 398/66 |
| 2010/0202467 | A1* | 8/2010 | Otani | H04L 12/2834 370/401 |
| 2011/0188857 | A1* | 8/2011 | Zheng | H04L 12/6418 398/45 |

OTHER PUBLICATIONS

LAN/MAN Standards Committee of the IEEE Computer Society, IEEE Standard for Ethernet, IEEE802.3-2018 clause 64, Aug. 31, 2018.

IEEE Standard for Service Interoperability in Ethernet Passive Optical Networks (SIEPON), IEEE Std. 1904.1-2017, Jul. 24, 2017, pp. 306-310.

* cited by examiner

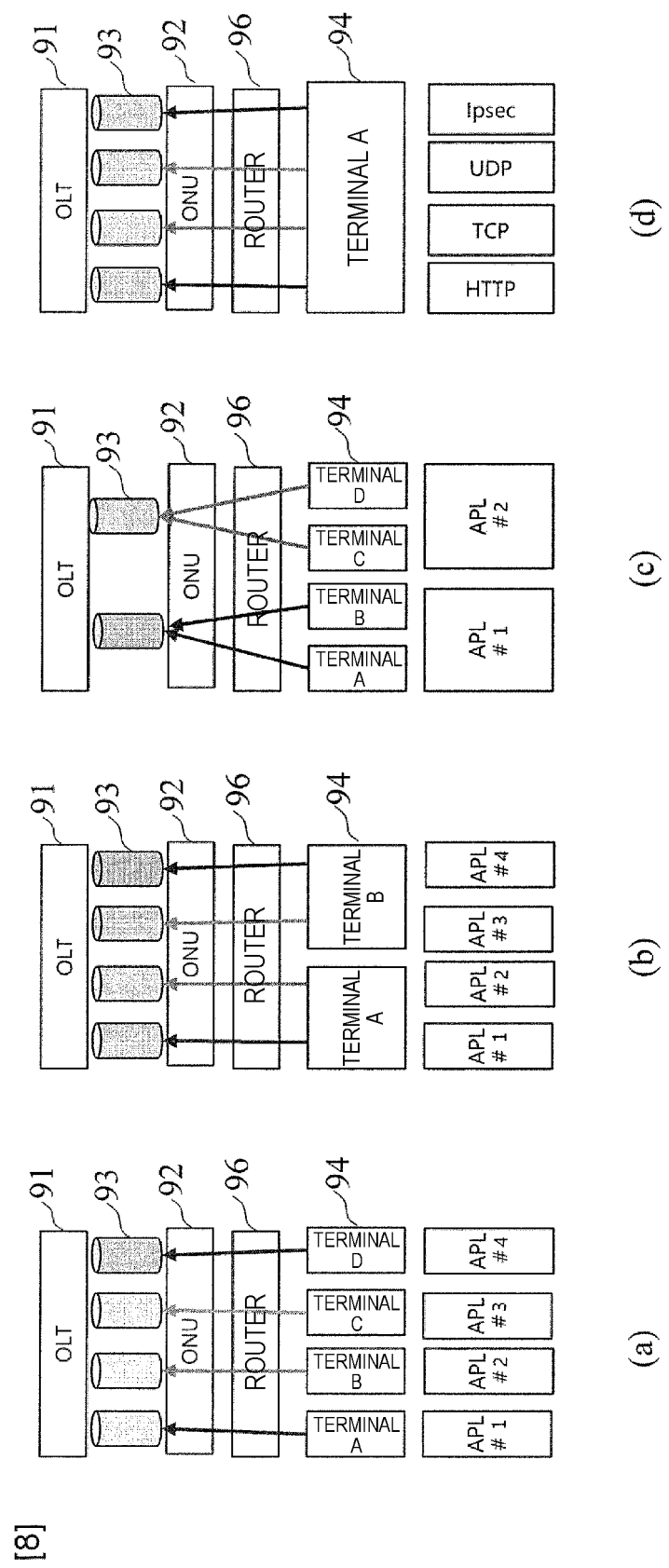

US 12,052,056 B2

OPTICAL COMMUNICATION NETWORK SYSTEM, OPTICAL NETWORK UNIT, AND OPTICAL COMMUNICATION METHOD

CROSS-REFERENCE TO RELATED APPLICATIONS

This application is a 371 U.S. National Phase of International Application No. PCT/JP2020/014759, filed on Mar. 31, 2020. The entire disclosure of the above application is incorporated herein by reference.

TECHNICAL FIELD

The disclosure relates to an optical communication network system (passive optical network (PON) system) and an optical communication method.

BACKGROUND ART

For user's terminal device using network services by connecting to a network through an optical transmission line, a technology to connect optical network units in customer premises to the network via an optical line terminal (OLT) has been proposed (see, for example, Non-Patent Literature 1).

In Non-Patent Literature 2, an OLT uses a logical link ID (LLID) to identify the logical path of each ONU. In Non-Patent Literature 3, each ONU has one media access control (MAC) address, and an OLT allocates one LLID to each ONU based on the MAC address possessed by each ONU. The ONU performs authentication based on the LLID and generates a logical path.

In this connection, a technology has been proposed that allows a single ONU to construct a plurality of logical paths by allocating a plurality of LLIDs and MAC addresses to the single ONU (see, for example, Patent Literature 1).

However, to allocate LLIDs, the MAC addresses, corresponding to the number of logical paths to be generated for an ONU, need to be set in advance, which makes it difficult to increase the number of logical paths as desired. Specifically, in a conventional LLID distribution technology, logical path generation is performed based on the MAC address previously allocated to an ONU. Accordingly, when a plurality of MAC addresses are not allocated to the ONU, a plurality of logical paths cannot be generated. Moreover, the number of logical paths that can be generated is limited to the number of MAC addresses previously set to the ONU. Accordingly, a system can be considered in which an ONU acquires unique identity information from a connected terminal device, and the LLID generates logical path to the OLT based on the acquired ID information.

CITATION LIST

Patent Literature

Patent Literature 1: Japanese Patent Laid-Open No. 2007-74256

Non-Patent Literature

Non-Patent Literature 1: "gijutsu kiso kouza [GE-PON Gijutsu] dai 4 kai, GE-PON no shisutemuka kinou" ("Technical Basic Course [GE-PON technology] 4th, GE-PON Systematized Functions") NTT Technical Review, pp. 59-61, November 2005

Non-Patent Literature 2: IEEE802.3-2018, clause 64
Non-Patent Literature 3: IEEE1904.1 SIEPON

SUMMARY OF THE INVENTION

Technical Problem

As a typical method for obtaining information about a terminal device, it can be considered to acquire information included in an address resolution protocol (ARP) request from the terminal device and using a MAC address or the like of the terminal device as an information ID. However, in this case, the method is applied only to the terminal device that is directly connected to an ONU, and cannot be applied to environments where terminal devices of a plurality of users are connected to the ONU via a router device (NAPT device) such as Home Gateway. For this reason, a system is required which enables the ONU to acquire ID information of the terminal devices that are connected through a network device such as a router.

Accordingly, an object of the present disclosure is to enable an ONU to acquire ID information of terminal devices even when a network device is connected between the ONU and the terminal devices, and to thereby enable generation of a logical path between the ONU and the OLT.

Means for Solving the Problem

An optical communication network system of the present disclosure is a passive optical network (PON) system configured such that one or more terminal devices are connected to an optical network unit (ONU) via a network device. In the PON system, the network device that connects directly to the terminal device is provided with an ID acquisition/notification unit, and the ID acquisition/notification unit acquires terminal ID information of the terminal device and notifies the terminal ID information to the ID acquisition unit of the ONU. The ONU is configured to generate a logical path generation address from the acquired terminal ID information, and perform generation and management of the logical path for each of the terminal devices.

Here, the network device of the present disclosure is an optional device that can connect one or more terminal devices to an ONU, the optional device including Home Gateway and other router devices (Network address port translation (NAPT)/IP masquerade/Port address translation devices).

Specifically, the optical communication network system according to the present disclosure is an optical communication network system configured to connect a terminal device and a passive optical network (PON) system via a network device. The PON system includes an OLT and an ONU connected using an optical transmission line. The network device is configured to acquire ID information of the terminal device, and notify the ONU of the acquired ID information. The ONU is configured to acquire the ID information of the terminal device from the network device, and generate a logical path to the OLT on the optical transmission line using the acquired ID information.

Specifically, an ONU according to the present disclosure is an ONU connected to an OLT using an optical transmission line and connected to a terminal device via a network device. The ONU is configured to acquire ID information of the terminal device from the network device, and generate a logical path to the OLT on the optical transmission line using the acquired ID information.

Specifically, an optical communication method according to the present disclosure is an optical communication method executed by an ONU connected to an OLT using an optical transmission line and connected to a terminal device via a network device. The optical communication method includes: acquiring ID information of the terminal device from the network device, and generating a logical path to the OLT on the optical transmission line using the acquired ID information.

Effects of the Invention

According to the present disclosure, even when communication between an ONU and a terminal device is via a router such as Home Gateway in the situation where a logical path between the ONU and the OLT is not generated, the ID information of the terminal device can be acquired and used to generate the logical path between the OLT and the ONU. As a result, logical path allocation can be performed for each terminal device, and different bandwidth allocation and priority control can be performed for each terminal device even when each terminal device is under the same ONU.

BRIEF DESCRIPTION OF DRAWINGS

FIG. 8 shows examples of a logical path for each service.

DESCRIPTION OF EMBODIMENTS

An embodiment of the present disclosure will be described hereinafter in detail with reference to the drawings. The present disclosure is not limited to the embodiment stated below. The embodiment is merely exemplary, and the present disclosure can be carried out in modes changed and modified in various manners based on the knowledge of those skilled in the art. Note that component members similar to each other are designated by similar signs in the present description and drawings.

(Outline of Present Disclosure)

Figure 1:
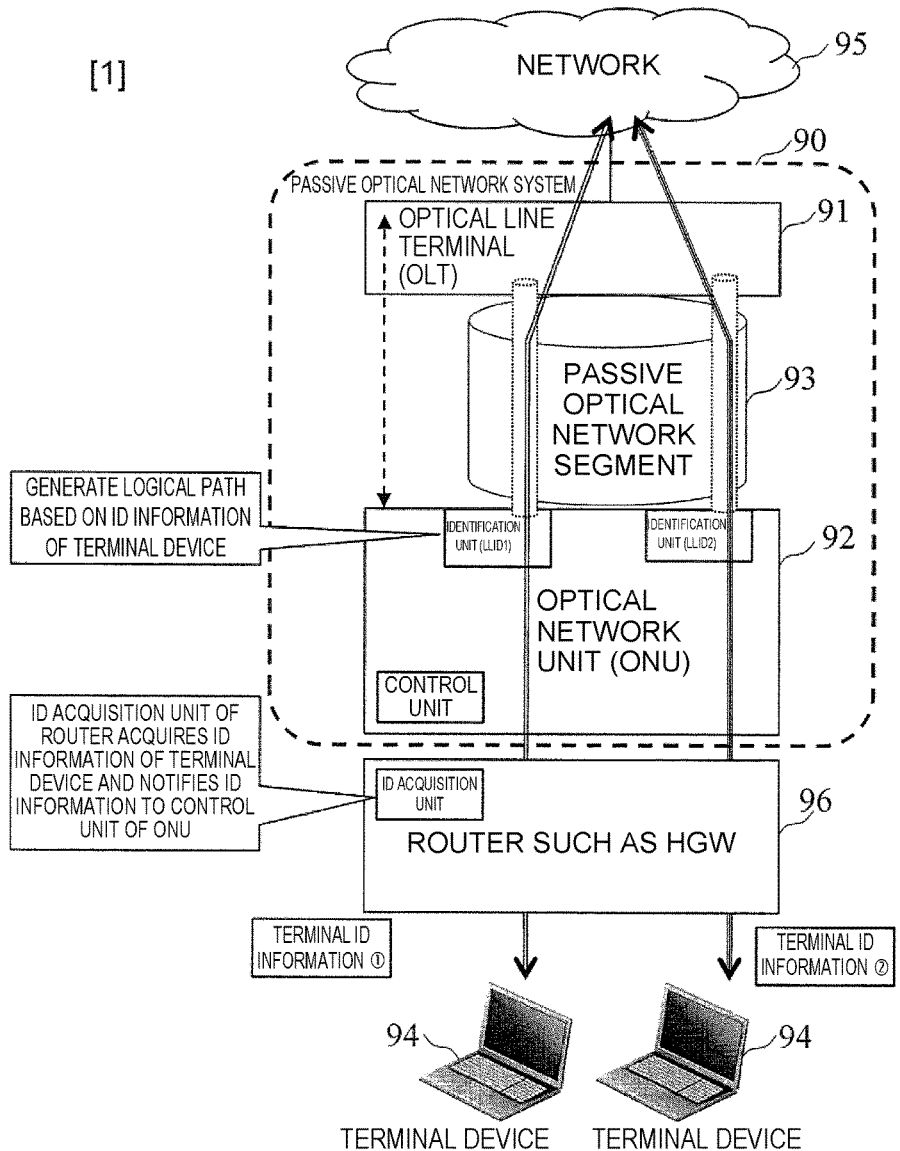
FIG. 1 shows an example of the schematic configuration of a system according to the present disclosure.

The outline of the present disclosure will be described with reference to FIG. 1. The system of the present disclosure cooperates with a router 96, such as Home Gateway, which connects directly to terminal devices 94. Since the router 96 is provided with functions to acquire ID information of the terminal devices 94 and notify the ID information to the control unit of an ONU 92, the ONU 92 generates addresses to generate logical paths from the ID information of the terminal devices 94, which makes it possible to generate and manage the logical path for each terminal device 94. The router 96 is an example of the network device of the present disclosure. In the embodiment described below, the network device is the router 96.

[Overall Configuration]

Figure 2:
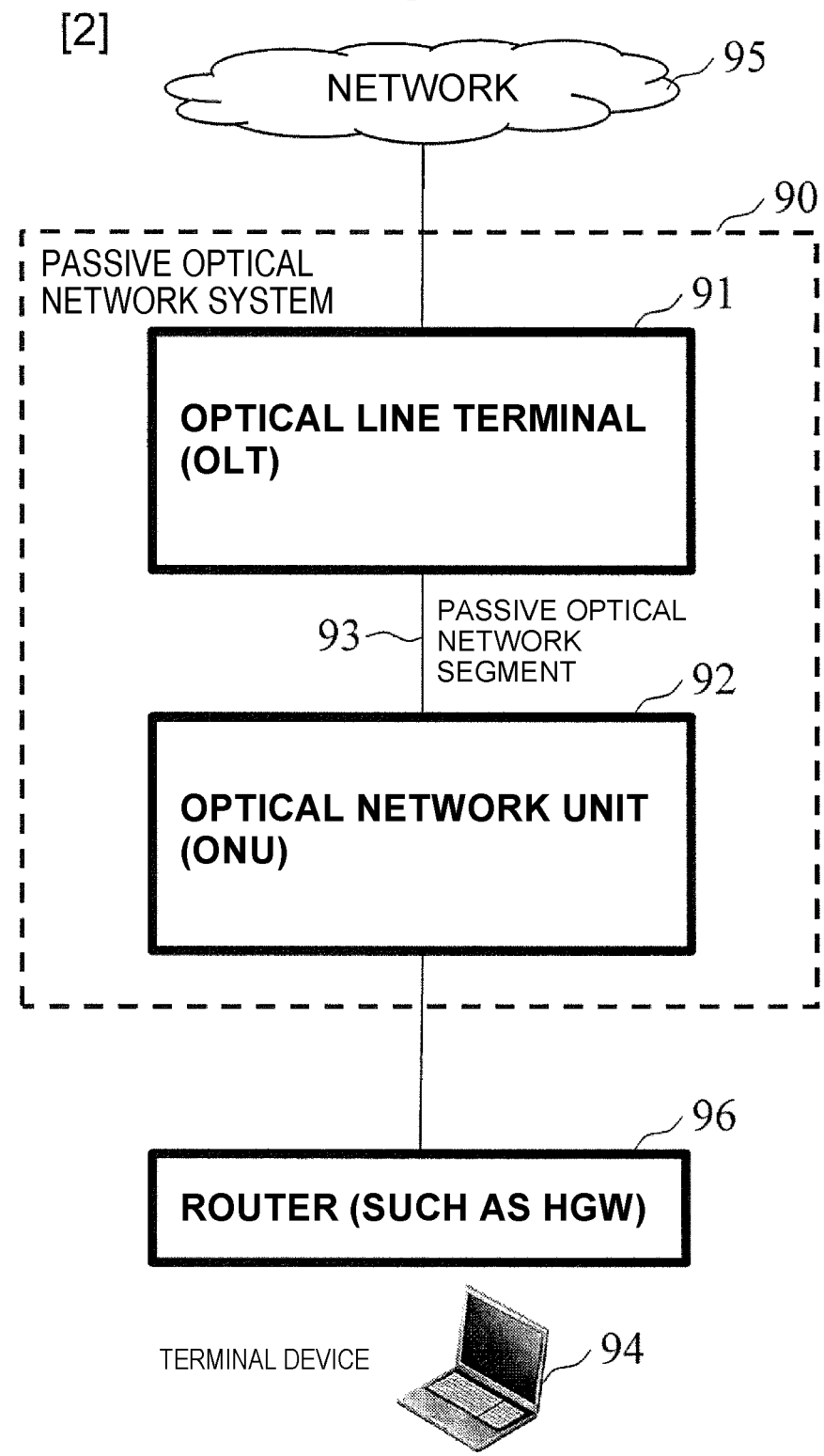
FIG. 2 shows an example of the overall configuration of the system according to the present disclosure.

FIG. 2 shows an example of the system configuration of the present disclosure. The optical communication network system of the present disclosure includes the terminal devices 94 for users, the router 96, a PON system 90, and a network 95. The PON system 90 includes the ONU 92, an optical transmission line 93 in a PON segment, and an OLT 91.

The terminal devices 94 are connected to the router 96 via a wired or wireless medium. The router 96 is connected to the ONU 92 via a wired or wireless medium. The ONU 94 is connected for communication to the OLT 91 via the optical transmission line 93 in the PON segment. The router 96 is a device that connects the terminal devices 94 to the ONU 92, the router 96 including network address port translation (NAPT)/IP masquerade/Port address translation devices, and Home Gateway.

Typically, the ONU 92 is considered to acquire information included in an ARP request from the terminal device 94 and use the MAC address or the like of the terminal device 94 as the identification information. However, in this case, the method can be applied only to the terminal device 94 directly connected to the ONU 92, and is not applicable to the environment where two or more terminal devices 94 are connected via the router 96. For this reason, a system is required which enables the ONU 92 to acquire ID information of the terminal devices 94 that are connected through the router 96. The ONU 92 usually inspect only the packets addressed to itself.

(Function Block Diagram)

Figure 3:
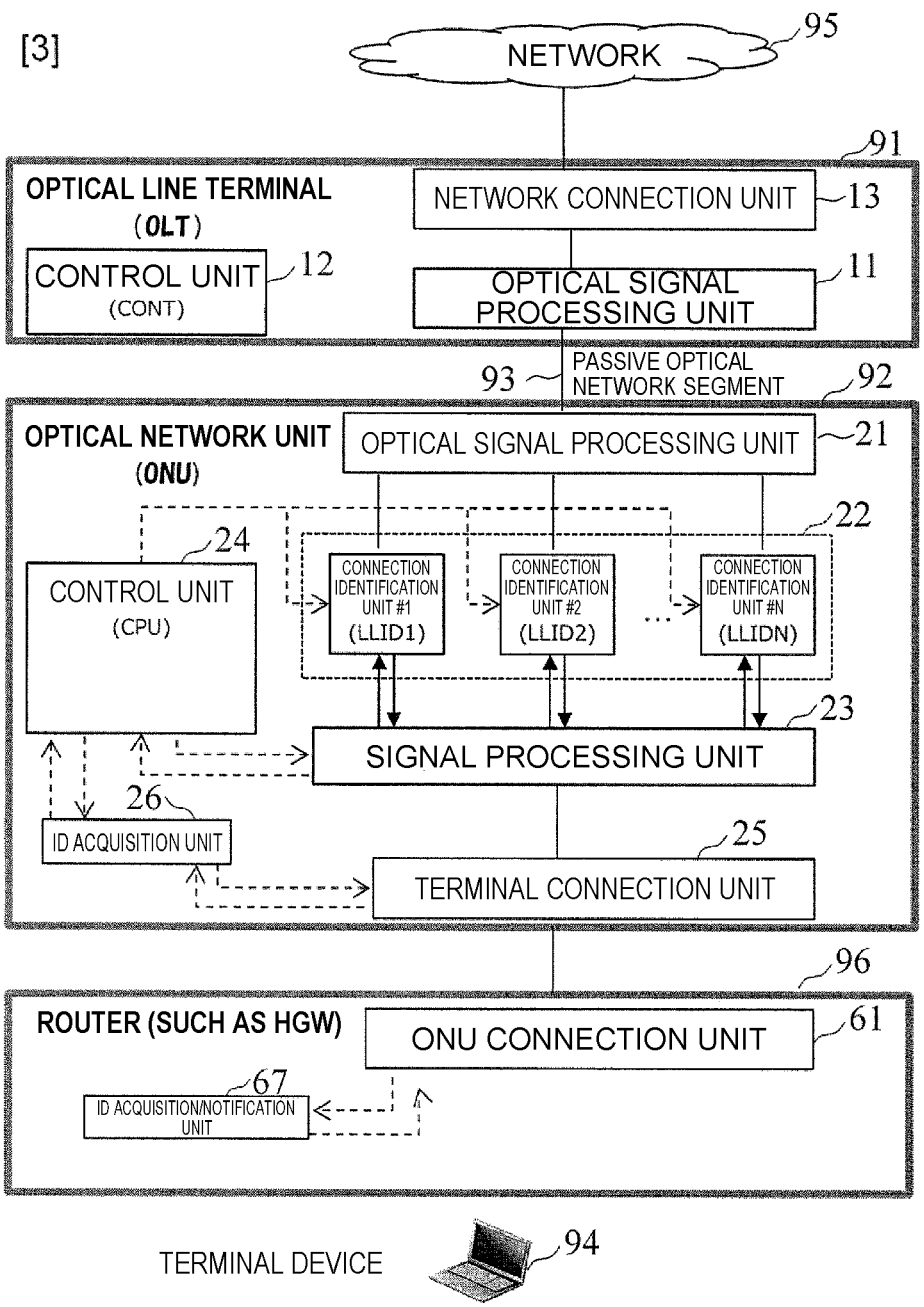
FIG. 3 shows an example of functional blocks of the system according to the present disclosure.

FIG. 3 shows an example of a functional block diagram of the optical communication network system of the present disclosure.

The OLT 91 includes an optical signal processing unit 11, a control unit 12 and a network connection unit 13.

The ONU 92 includes a terminal connection unit 25, a signal processing unit 23, a control unit 24, connection identification units 22 (#1, #2, . . . , #N (where N is an integer greater than or equal to 2), an optical signal processing unit 21, and an ID acquisition unit 26.

The router 96 includes an ONU connection unit 61 and an ID acquisition/notification unit 67.

[Configuration of ONU 92]

The terminal connection unit 25 is connected for communication to the router 96 via a wired or wireless medium. The terminal connection unit 25 is also connected to the signal processing unit 23.

The signal processing unit 23 is connected to the terminal connection unit 25. The signal processing unit 23 is also connected to the optical signal processing unit 25 via N connection identification units (#1 to #N) 22 in pair with one of the N connection identification units 22. The signal processing unit 23 is also connected for communication to the control unit 24.

The control unit 24 is connected for communication to the signal processing unit 23. The control unit 24 is also connected for communication to the N connection identification units (#1 to #N) 22, respectively.

The control unit 24 includes, for example, a processor such as a central processing unit (CPU).

The optical signal processing unit 21 is connected for communication to the signal processing unit 23 via N connection identification units (#1 to #N) 22 in pair with one of the N connection identification units 22. The optical signal processing unit 21 is connected for communication to the OLT 91 via the optical transmission line 93 in the PON segment.

Note that the connection identification units 22 are configured to identify, for example, the terminal devices 94 and the like based on the LLID, but are not limited to this configuration. For example, the connection identification units 22 can be configured by combining a connection identification unit that identifies the terminal device based on information different from the LLID, and a connection identification unit that identifies the terminal devices based on the LLID.

The ID acquisition unit 26 is connected for communication to the ID acquisition/notification unit 67 of the router 96 via the terminal connection unit 25 and the ONU connection unit 61 of the router 96 to acquire ID information. Here, the ID acquisition unit 26 may voluntarily request ID information, or acquire ID information from periodic notifications coming from the ID acquisition/notification unit 67 of the router 96.

The ID acquisition unit 26 is connected for communication to the control unit 24 to notify the control unit 24 of the ID information of the terminal device 94. The terminal device 94 may notify the control unit 24 of the ID information in response to a request from the control unit 24, or may voluntarily perform the periodic notification of ID information to the control unit 24.

[Configuration of OLT 91]

The optical signal processing unit 11 is connected for communication to the ONU 92 via the optical transmission line 93 in the PON segment. The optical signal processing unit 11 is also connected for communication to the network connection unit 13.

The control unit 12 includes a processor such as a CPU, for example.

The network connection unit 13 is connected for communication to the optical signal processing unit 11.

[Configuration of Router 96]

The ONU connection unit 61 is connected for communication to the ONU 61 via a wired or wireless medium. The ONU connection unit 61 is also connected for communication to the ID acquisition/notification unit 67.

The ID acquisition/notification unit 67 has a function to acquire the ID information of the terminal device 94 by an ARP request or the like from the terminal device 94, and to notify the ID information to the ID acquisition unit 26 of the ONU 92 via the ONU connection unit 61 and the terminal connection unit 25 of the ONU 92. Note that the notification may be made by voluntary periodic notification, or may be made in response to requests from the ID acquisition unit 26 of the ONU 92.

(Basic Flow at Time of Connecting Terminal Device 94)

Figure 4:
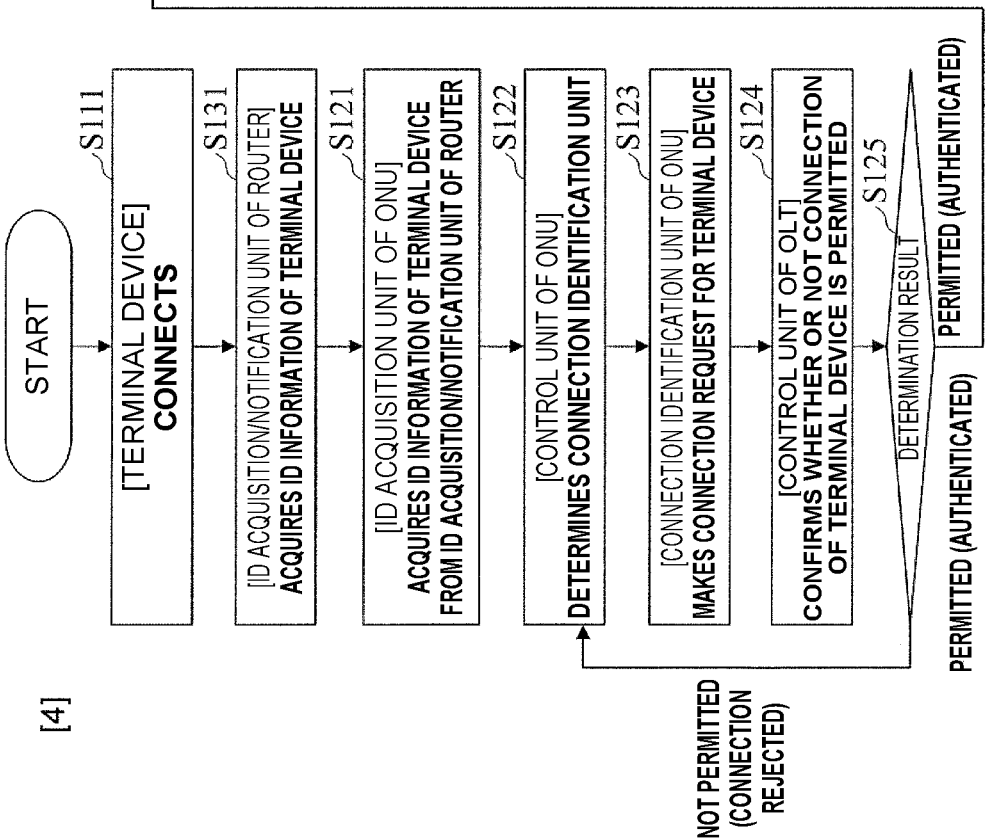
FIG. 4 shows an example of a basic flow at the time of connecting a terminal device and a router.
Figure 5:
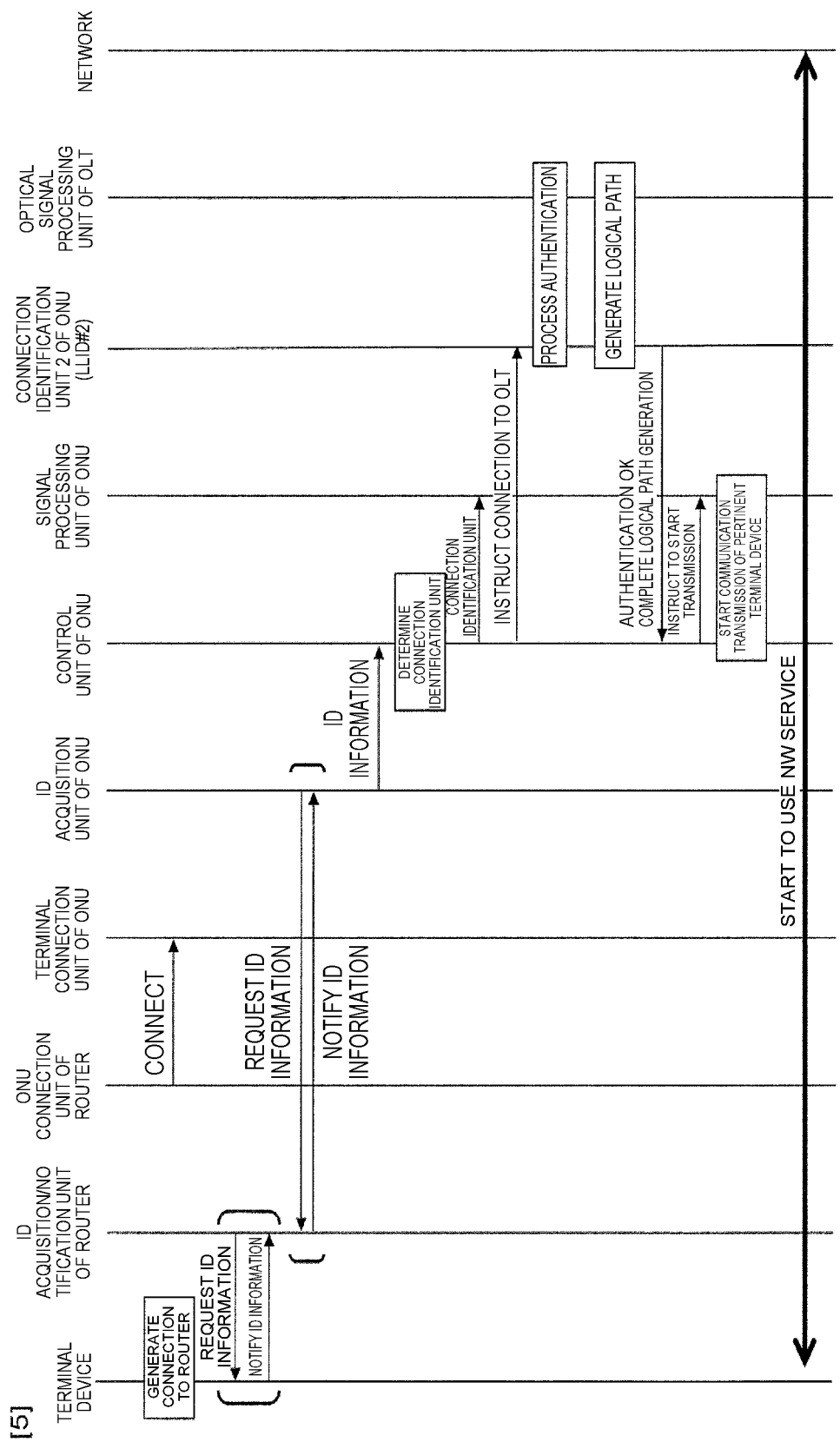
FIG. 5 shows a sequence diagram at the time of connecting the terminal device and the router.

FIG. 4 shows an example of a basic flow at the time of connecting the terminal device 94. FIG. 5 shows a sequence diagram at the time of connecting the terminal device 94. With reference to FIGS. 4 and 5, operation at the time of connecting the terminal device 94 in the present embodiment will be described.

Step S111: the terminal device 94 is connected to the router 96.

Step S131: the ID acquisition/notification unit 67 included in the router 96 acquires information about the terminal device 94 by an APR request or the like, and notifies the ID information of the terminal device 94 to the ID acquisition unit 26 of the ONU 92.

Step S121: the ID acquisition unit 26 included in the ONU 92 acquires information about the terminal device 94 from the ID acquisition/notification unit 67 of the router 96, and notifies the control unit 24 of the ID information of the terminal device 94.

Step S122: the control unit 24 determines the connection identification unit 22 #2 used to connect to the OLT 91. The control unit 24 then acquires the ID information from the ID acquisition unit 26 and uses the ID information of the terminal device 94 to generate a virtual MAC address of the connection identification unit 22 #2. As a consequence, the control unit 24 gives a connection instruction using the virtual MAC address to the determined connection identification unit 22 #2. The control unit 24 also notifies the signal processing unit 23 of the LLID and ID information of the connection identification unit 22 #2.

Step S123: the connection identification unit 22 #2 makes a connection request for terminal device 94 to the OLT 91. In this case, the connection identification unit 22 #2 makes an authentication request to the OLT 91.

Step S124: the control unit 12 of the OLT 91 authenticates the terminal device 94 using the LLID and the virtual MAC address received from the connection identification unit 22 #2 to confirm whether or not connection is permitted. In the case where the connection is "permitted (authenticated)", the control unit 12 of the OLT 91 generates a logical path between the optical signal processing units 11 and 21, and notifies the ONU 92 that the authentication is successful and generation of the logic path is completed. When acquiring the authentication result from the OLT 91, the connection identification unit 22 #2 notifies the control unit 24 of the authentication result.

Step S125: when the result of authentication by the OLT 91 is OK, i.e., "permitted (authenticated)" in step S125, the control unit 24 shifts to step S126. Meanwhile, when the result of authentication is NG, i.e., not permitted (connection rejected) in step S125, the control unit 24 shifts to step S122. In this case, the control unit 24 determines the connection identification unit 22 #1 which is different from the connection identification unit 22 #2.

Here, in step S122, the number of ID information pieces acquired by the ID acquisition unit 26 may be any number greater than or equal to 1. The number of and a combination of ID information pieces used by the control unit 24 to generate the virtual MAC address is optional.

The ID information may be an identifier that uniquely determines the terminal device 94. Examples of the ID information may include following identifiers. Any of these may be used.

Figure 6:
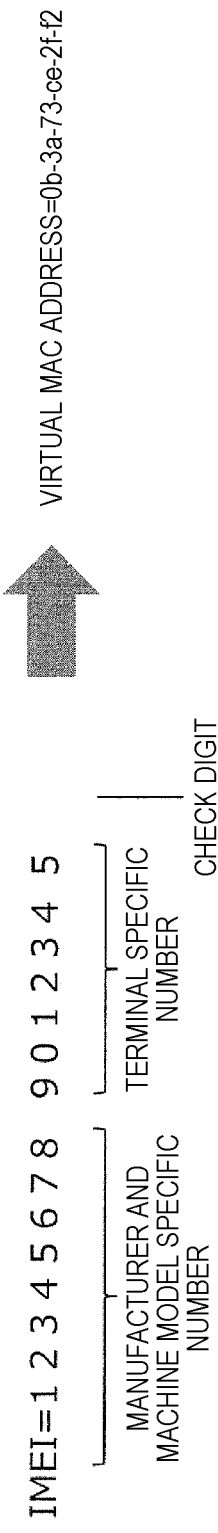
FIG. 6 is an explanatory view of a method for generating a virtual MAC address.

MAC address
Subscriber identity module (SIM)
International mobile equipment identifier (IMEI)
Phone number
International mobile subscriber identity (IMSI)
IC card identifier (ICCID)
Host name
Production serial number The virtual MAC address can be generated in any way. For example, there is a method of generating a new virtual MAC address from only the ID information of the terminal device 94, without linking the physical MAC address of the ONU 92 with the ID information of the terminal device 94. For example, as shown in FIG. 6, out of an IMEI (decimal number of up to 15 digits) of the terminal device 94, a number of up to 14 digits excluding a last check digit is converted to a hexadecimal number. When the digits of the number is less than 12 digits, 0 is appended to upper digits to generate the virtual MAC address. In this way, the control unit 24 generates a virtual MAC address. The generated virtual MAC address is used to identify and authenticate the terminal device 94.

The control unit 24 may further acquire information about the router 96 as ID information. The information about the router 96 is, for example, a MAC address and a production serial number of the router 96. In this case, in generation of the virtual MAC address, the control unit 24 may generate the virtual MAC address using the information from the router 96. Combining the information from the router 96 to generate a virtual MAC address makes it possible to avoid duplication of the virtual MAC addresses in the OLT 91. In addition, in the present disclosure, the ID information of the terminal 94 can be collected once into the router 96. This makes it easier to link the LLID, which is associated with the terminal 94 or an application, with routing information, so that more comprehensive and proper use of the ID information becomes possible.

The ID information may have priority set for generation of the virtual MAC address. Examples of the operation of the ID acquisition unit 26 and the control unit 24 may include the followings.

The ID acquisition unit 26 acquires a plurality of ID information pieces at once, and the control unit 24 generates the virtual MAC address by using the ID information pieces in a specific priority. When authentication is not obtained in a connection request, the control unit 24 generates the virtual MAC address in sequence by using the ID information pieces specified according to the priority.

The ID acquisition unit 26 acquires a plurality of ID information pieces at once, the control unit 24 combines the plurality of ID information pieces to generate the virtual MAC address. The authentication is performed by using the virtual MAC address. The authentication is performed by matching the respective ID information pieces included in the virtual MAC address. In this case, a high-order connection destination of the OLT 91 may be changed based on the matching state of the plurality of ID information pieces.

Note that when connection is rejected in authentication determination performed in step S125, the control unit 24 may return to acquire the ID information (S121). In this case, examples of the processing by the ONU 92 may be as shown below.

The ID acquisition unit 26 acquires information from various types of ID information according to a specific priority. The flow of steps S121 to S125 is sequentially repeated until authentication "permitted" is achieved.

The ID acquisition unit 26 performs a plurality of acquisition methods to acquire the same ID information according to a specific priority. The flow of steps S121 to S125 is sequentially repeated while the acquisition methods performed by the ID acquisition unit are changed until authentication "permitted" is achieved.

Step S126: the control unit 24 instructs the connection identification unit 22 #2 determined in Step S122 to generate a logical path.

Step S127: the connection identification unit 22 #2 generates a logical path between the ONU 92 and the OLT 91. Once the logical path is generated, the connection identification unit 22 #2 notifies the control unit 24 that generation of the logical path is completed. In this case, the connection identification unit 22 #2 may notify the control unit 24 that the authentication result is OK.

Step S128: the control unit 24 instructs the signal processing unit 23 to start transmission between the connection identification unit #2 and the terminal device 94.

Step S112: the terminal device 94 starts to use network services.

The connection processing for the terminal device 94 is completed by the OLT 91 and the ONU 92 performing the above processing. Note that the authentication processing in step S125 can be performed after the logical path is generated or at the same time when the logical path is generated.

Figure 7:
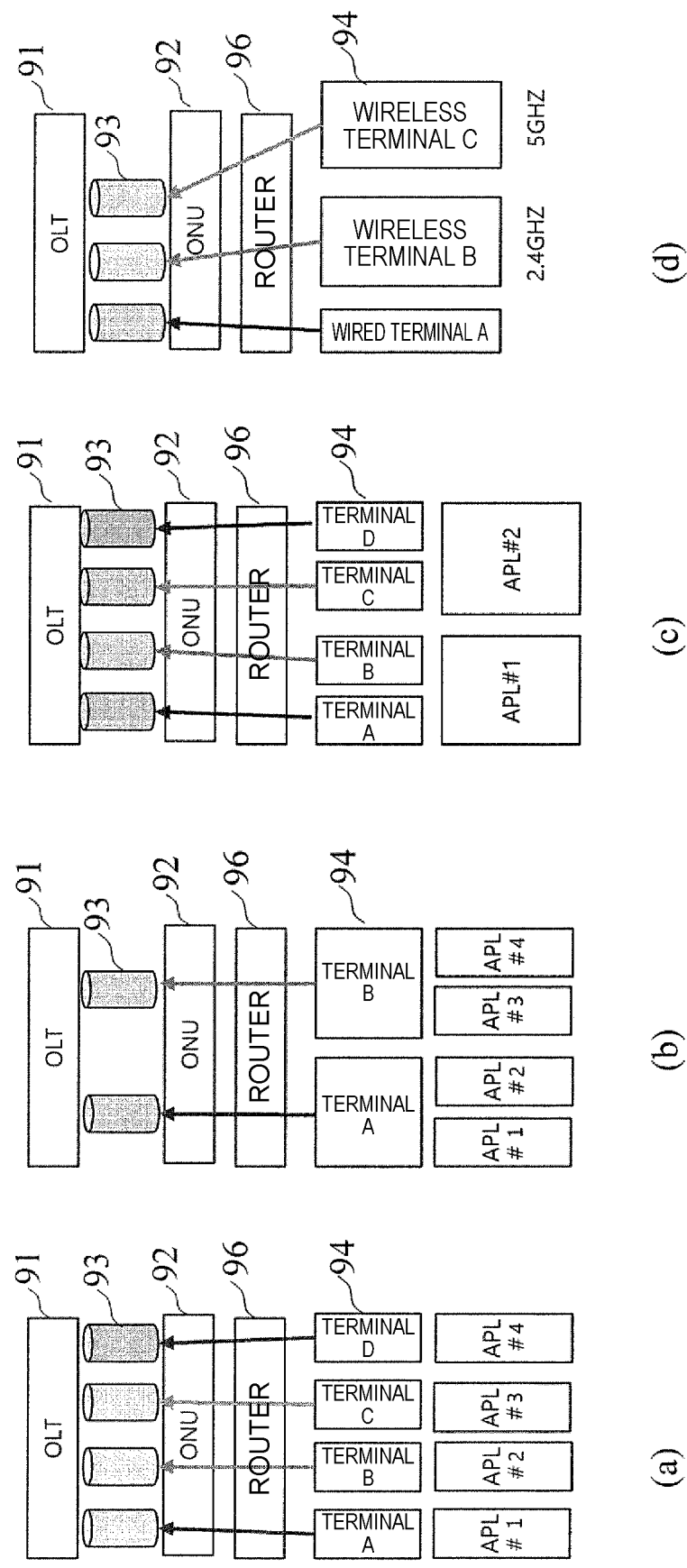
FIG. 7 shows examples of a logical path for each terminal device.

FIG. 7 shows examples of a logical path for each terminal device 94 (or each user). The logical path for each terminal device 94 is generated one application for each terminal device 94 as shown in FIG. 7(a), for example. When one terminal device 94 runs a plurality of applications, the ONU 92 may generate a single logical path for the plurality of applications as shown in FIG. 7(b). When the plurality of terminal devices 94 run a common application, the ONU 92 may generate a logical path for each of the terminal device 94 as shown in FIG. 7(c). Here, the logical path may be generated for each terminal device group or for each type of the terminal devices 94 instead of for each terminal device 94. As shown in FIG. 7(d), the ONU 92 may also generate a logical path different for each connection method (WiFi, wired, etc.) used between the terminal device 94 and the router 96. The method of logical path generation is also applicable to the cases without using a device, such as the router 96, to connect the terminal device 94 to the ONU 92.

FIG. 8 shows examples of a logical path for each service. The logical path is generated one application for each terminal device 94 as shown in FIG. 8(a) for example. When one terminal device 94 runs a plurality of applications, the ONU 92 may generate a plurality of logical paths for the one terminal device 94 according to the number of applications as shown in FIG. 8(b). When the plurality of terminal devices 94 run a common application, the ONU 92 may generate a common logical path for the plurality of terminal device 94 as shown in FIG. 8(c). Here, the logical path may be generated for each application group or application type instead of for each application. As shown in FIG. 8(d), the ONU 92 may also generate a logical path different for each communication protocol for one terminal device 94. The method of logical path generation is also applicable to the cases without using a device, such as the router 96, to connect the terminal device 94 to the ONU 92.

INDUSTRIAL APPLICABILITY

This disclosure may be applied to the information and communications industry.

REFERENCE SIGNS LIST 11, 21 Optical signal processing unit
12, 24 Control unit
13 Network connection unit
22 Connection identification unit
23 Signal processing unit
25 Terminal connection unit
26 ID acquisition Unit
61 ONU connection unit
67 ID acquisition/notification unit
90 PON system
91 OLT
92 ONU
93 Optical transmission line
94 Terminal device
95 Network
96 Router

The invention claimed is:

1. An optical communication network system configured to connect a terminal device and a passive optical network (PON) system via a network device, wherein
the PON system includes an optical line terminal and an optical network unit connected using an optical transmission line,
the network device is configured to acquire ID information of the terminal device, and notify the optical network unit of the acquired ID information, and
the optical network unit is configured to acquire the ID information of the terminal device from the network device, and generate a logical path to the optical line terminal on the optical transmission line using the acquired ID information.

2. The optical communication network system according to claim 1, wherein
the network device acquires the ID information of the terminal device using an address resolution protocol (ARP).

3. An optical network unit connected to an optical line terminal using an optical transmission line and connected to a terminal device via a network device, the optical network unit being configured to:
acquire ID information of the terminal device from the network device, and generate a logical path to the optical line terminal on the optical transmission line using the acquired ID information.

4. An optical communication method executed by an optical network unit connected to an optical line terminal using an optical transmission line and connected to a terminal device via a network device, the optical communication method comprising:
acquiring ID information of the terminal device from the network device, and generating a logical path to the optical line terminal on the optical transmission line using the acquired ID information.

* * * * *